United States Patent [19]

Claussen

[11] Patent Number: 5,158,916
[45] Date of Patent: Oct. 27, 1992

[54] PROCESS OF PRODUCING POWDER-METALLURGICALLY PRODUCED CERAMIC FORMED BODY

[76] Inventor: Nils Claussen, Auf den Schwarzen Bergen 15, D-2107 Rosengarten, Fed. Rep. of Germany

[21] Appl. No.: 585,119

[22] PCT Filed: Apr. 10, 1989

[86] PCT No.: PCT/EP89/00382

§ 371 Date: Sep. 27, 1990

§ 102(e) Date: Sep. 27, 1990

[87] PCT Pub. No.: WO89/09755

PCT Pub. Date: Oct. 19, 1989

[30] Foreign Application Priority Data

Apr. 13, 1988 [DE] Fed. Rep. of Germany ....... 3812266

[51] Int. Cl.$^5$ .................. C04B 35/10; C04B 35/65
[52] U.S. Cl. ...................................... 501/127; 501/96; 501/98; 501/128; 501/87; 501/89; 501/105; 264/60
[58] Field of Search .................. 501/96, 98, 127, 128, 501/89, 87, 105; 264/60, 65

[56] References Cited

U.S. PATENT DOCUMENTS

| | | | |
|---|---|---|---|
| 3,551,101 | 12/1970 | Matsuo et al. | 419/13 X |
| 4,460,528 | 7/1984 | Petrak et al. | 501/127 X |
| 4,670,407 | 6/1987 | Kiehl et al. | 501/96 X |
| 4,716,133 | 12/1987 | Horiuchi et al. | 501/98 X |
| 4,851,375 | 7/1989 | Newkirk et al. | 501/127 X |
| 4,867,761 | 9/1989 | Brandt et al. | 501/127 X |
| 4,877,759 | 10/1989 | Holt et al. | 501/96 |
| 4,921,818 | 5/1990 | Lesher et al. | 501/127 X |
| 4,923,832 | 5/1990 | Newkirk et al. | 501/127 X |
| 4,988,645 | 1/1991 | Holt et al. | 501/98 X |

FOREIGN PATENT DOCUMENTS 862723 12/1953 Fed. Rep. of Germany .
962749 7/1964 United Kingdom .

*Primary Examiner*—Karl Group

[57] ABSTRACT

The instant invention is directed to the production of ceramic bodies of at least one disperse inorganic component embedded in a phase of aluminum oxide by producing a mixture of aluminum powder and optionally an alloying element, and a disperse inorganic component which contains at least 40 vol. % of aluminum oxide, attriting the mixture, forming a body, and sintering the body in an oxidizing atmosphere.

15 Claims, 1 Drawing Sheet

PROCESS OF PRODUCING POWDER-METALLURGICALLY PRODUCED CERAMIC FORMED BODY

DESCRIPTION

Single and multiple phase formed bodies with ceramic matrix are increasingly used as temperature- and wear-resistant components in machine and apparatus construction. Such bodies are produced either via classical ceramic (i.e. powder metallurgical) processes by pressing and sintering or they are produced by reaction of metallic precursors with a gaseous or liquid phase (see e.g./"Reaction-Formed Ceramics", Am. Ceram. Soc. Bull., 67 (1988) 356). These so-called reaction-bound ceramics have hitherto been limited almost exclusively to $Si_3N_4$ (RBSN) and SiC (RBSC). A further possibility especially to produce multiphase ceramics is the infiltration of a porous ceramic body with a metallic or ceramic phase (see e.g. "Melt Infiltration Approach to Ceramic Composites", J. Am. Ceram. Soc., 71 (1988) C-96). In a further novel process, a porous ceramic body is grown through by a ceramic phase which results by reaction of a gas with a metallic melt which possesses a one or multi-sided entry to the porous ceramic preliminary body (see e.g. "Formation of Lanxide Ceramic Composite Materials", J. Mater. Res. 1 (1986) 81).

All these ceramic classes and their production processes have characteristic disadvantages which the following described invention possesses scarcely or only to a small extent. The decisive disadvantage of classically produced ceramics or ceramic composite materials lies in the high linear shrinkage which occurs between the green body and the end product; usually, it amounts to 15 to 25%. This typical shrinkage makes the shape and measurement stability of a formed part problematical, it leads to crack formation and other quality-reducing faults. The shrinkage of a ceramic matrix acts disadvantageously especially also in the case of the incorporation of reinforcing elements, such as fibres, platelets and whiskers or other, non-co-shrinking components, on the structure cohesion. The high stresses arising as a result of the shrinkage differences lead almost always to damaging cracks. A further characterising disadvantage, especially of the classically produced oxide ceramics, lies in the formation of a glass-like intergranular phase which admittedly accelerates the sinter and consolidation process but strongly impairs the mechanical high temperature properties.

Reaction-bound ceramics, above all $Si_3N_4$ (RBSN) and SiC and also ceramics produced via the lanxide process (inter alia $Al_2O_3$ and AlN), admittedly show no or only small shrinkage but the course of the production is sensitively impaired by the often week-long reaction times. A further disadvantage of the RBSN-like ceramics lies in the fact that only bodies with seldom more than 85% of the theoretical density can be achieved, which is to be attributed to the nitrogen diffusion reducing ever more with decreasing porosity. According to experience, such a low density results in poor mechanical properties (see "Review: Reaction-Bonded Silicon Nitride: its Formation and Properties", J. Mater. Sci., 14 (1979) 1017). The production of ceramic composite material based on $Al_2O_3$ and AlN by melt reaction and therewith involved growing through of a porous ceramic preliminary body is, inter alia, described in the recently published European Patent Applications 0155831, 0169067, 0193282 and 0234704. The reaction hereby also proceeds very slowly. Furthermore, the dimension control of the bodies is involved with great expense.

Therefore, the task forming the basis of the invention is to provide a ceramic formed body which does not display or only in substantially small extent the above-mentioned disadvantages of the known formed bodies.

This task is solved by a powder-metallurgically produced ceramic formed body consisting of at least one dispersed inorganic component which is embedded in a phase of aluminium oxide and/or aluminium nitride which is characterised in that it a) displays a longitudinal change of less than ±10% in comparison with the green state,
b) possesses a porosity of less than 15%,
c) possesses a glass phase-free grain boundary and is obtained by sintering from a green body which, besides the dispersed inorganic components, contains at least 10 vol. % of aluminium powder, which can have one or more of the alloying elements Mg, Si, Zn, Pb, Na, Li, Se, which, after the sintering treatment, is partly or completely reacted to $Al_2O_3$ and/or AlN and/or aluminium oxide nitride, whereby the morphology of the inorganic components dispersed in it is not changed by the sinter process.

According to a first embodimental form of the invention, the dispersed inorganic component of the ceramic formed body consists preponderantly or completely of $Al_2O_3$ and/or AlN in the form of powder-, platelet- and/or needle-shaped particles.

According to a further preferred embodimental form, the dispersed phase of the formed body contains mullite, SiC, $B_4C$, TiC, $Si_3N_4$ or alloys thereof in the form of fibres, whiskers or platelets, whereby the total amount referred to the formed body, amounts to 5 to 50 vol. %. This dispersed phase can hereby consist solely of the mentioned fibres, whiskers or platelets or be present in admixture with the above-described particles of $Al_2O_3$ and/or AlN and possibly $ZrO_2$.

In a further preferred embodimental form, the dispersed inorganic component consists of powder particles of one or more of the carbidic phases SiC, $B_4C$, TiC, WC, TaC and/or of the nitridic phase $Si_3N_4$ and/or of the boridic phases $ZrB_2$ and $TiB_2$ alone or in admixture with the above-mentioned particle forms of $Al_2O_3$ and/or AlN.

By suitable choice of the pressing power used in the production of the body and of the relationship of $Al_2O_3$ to metallic aluminium, the linear shrinkage or extension can be reduced to less than 1% in comparison with the green state, as is described in more detail in Example 1.

The formed body according to the invention is thereby produced in that one or more inorganic dispersed phases, preferably $Al_2O_3$ powder is mixed with an aluminium powder, thereafter pressed and subsequently calcined in the air at temperatures between 900° and 1600° C. The metallic phase thereby binds the $Al_2O_3$ powder particles (or other inorganic particles) with simultaneous reaction to $Al_2O_3$. The volume extension involved with this reaction thereby fills most of the pores present in the pressed body and compensates the shrinkage caused by the sintering. In the case of suitable choice of the pressure force for the green body and the relationship of $Al_2O_3$ (or of other inorganic phases or phase mixtures) to Al powder, a volume change between green and finished body can be completely avoided. Analogously to reaction-bound $Si_3N_4$, the product can be designated as reaction-bound $Al_2O_3$ (RBAO).

The formation of the formed body according to the invention is surprising since pure Al powder under pressing or calcining conditions either reacts explosively (in the case of extreme Al powder fineness, i.e. <about 10 μm.) or however swells up like a yeast cake without bringing about a cohesion between the resulting $Al_2O_3$ particles. I.e. it was to be expected that no solid body results. A powder combination of $Al_2O_3$ with pure Al leads, however, to a relatively solid, reaction-bound body. The powder form of Al used according to the invention with possibly small amounts of Mg, Si and Zn powder, together with at least 40 vol. % $Al_2O_3$ powder or AlN gives still denser and more solid formed bodies. Admittedly, from the work of W. Thiele (Aluminium, 38 (1962) 707), S. Balicki (Trace Inst. Hutn. 10 (1958) 208), M. Drouzy and C. Mascare (Metallurgical Reviews, 131 (1969) 25), M. Richard and R. Emery (Fonderie 373 (1977) 389) and from previously-mentioned lanxide Applications (see, inter alia, EP 0234704), it is known that especially additions of Mg, Na, Se, Zn, Mn and Si accelerate the oxidation of Al melts but they would all the more give a yeast cake-like blown out body. Even when ZnO and MgO were added thereto in amounts between about 0.1 and about 5 wt. %, pure aluminium powder led to solid bodies. Especially with regard to the products of the lanxide process, it is surprising that the metallic phase is completely oxidised to $Al_2O_3$. The high density of the grain boundaries, which are available as oxygen diffusion paths, present in the formed body according to the invention provide a possible explanation. A further surprise, for which hitherto no explanation was found, was the fact that, in the formed body according to the invention, grain boundaries without glass phases could be observed: this phenomenon can be observed in the case of at least 30% of the investigated grain boundaries.

The sintering preferably takes place in the air at temperatures between 900° and 1550° C. at a total pressure of 0.05 to 0.3 MPa.

The amount of Al powder used for the production of the green body preferably amounts to 10 to 50 vol. %, referred to the mixture with the dispersed inorganic components. If Al alloy powder is used, this can be employed as such with the above-given alloying components or consist of a mixture of the powder of pure aluminium and the alloying elements or the compounds of the alloying elements forming the alloy under the sinter conditions. In particular, in this case, pure non-alloyed Al powder can be added together with oxides of the alloying elements, whereby magnesium can be used in the form of MgO or $MgAl_2O_4$, Si in the form of $SiO_2$ and Zn in the form of ZnO in amounts which correspond to between 0.1 and 10 wt. %, preferably of 0.5 to 10 wt. % of the alloying element. Consequently, the preferred content of metallic alloying elements in the Al alloys is 0.5 to 10 wt. % Mg and/or Si and/or Mn and/or Zn and/or Pb and/or Se and/or Na and/or Li. The $Al_2O_3$ powder is expediently used as starting component with a particle size in the range of 1 to 100 μm., preferably of 10 to 30 μm.

The starting components are expediently homogenised or mechanically alloyed in a ball mill, especially in an attritor, and the powder obtained then worked up to the green body. The green body of the metal/ceramic powder mixture can be produced by dry pressing, slip casting or extruding. The grinding or attrition expediently takes place in a liquid medium inert towards the components, such as acetone or an alcohol, such as isopropanol.

The sinter step itself is carried out in an oxygen- or nitrogen-containing atmosphere at a pressure between 0.05 and 10 MPa. Preferred is the range between 0.08 and 0.5 MPa, quite especially preferred the range between 0.09 and 0.11 MPa.

According to a special embodimental form of the invention, after the sinter treatment, there is also carried out a hot isostatic post-consolidation in a pressure transfer medium of Ar, $Na_2$ or a mixture of Ar and $O_2$ (HIP).

For the sinter treatment, the green body can usually be heated up with a warming-up phase to the actual sinter temperature. However, the warming-up phase can also be omitted and the green body introduced directly into the hot furnace at temperatures between 900° and 1200° C. and kept at this temperature until at least partial reaction of the Al powder and subsequently cooled. The holding time is preferably so adjusted that a complete reaction of the Al powder takes place. For this purpose, the actual calcining treatment at 900° to 1200° C. is followed by an after-heating to 1300° to 1600° C. in order to ensure a complete reaction of the aluminium.

The ceramic formed body according to the invention can be used as matrix for the embedding of whiskers, fibres or other forms of reinforcement of differing inorganic materials. In this case, there are expediently used 5 to 50 vol. %, referred to the mixture of disperse inorganic component and Al powder, of fibres, whiskers or platelets which, in turn, can consist of $Al_2O_3$, mullite, $ZrO_2$, SiC, $B_4C$, TiC, $Si_3N_4$, AlN or alloys of these substances.

Apart from the above already-mentioned preferred inorganic components in the form of $Al_2O_3$ and AlN, as disperse inorganic components there can also be used powder particles of one or more of the carbidic phases SiC, $B_4C$, TiC, WC, TaC and/or of the nitridic phase $Si_3N_4$ and/or of the boridic phases $ZrB_2$ or $TiB_2$.

A further improvement of the physical properties of the formed body according to the invention can be achieved by infiltration of the final formed body with liquid aluminium at 900° to 1700° C. The pores still present are hereby filled by the liquid aluminium so that a completely solid body is achieved.

The ceramic formed body according to the invention is preferably used as temperature- and wear-resistant component in machine, apparatus and engine construction, as cutting tool or as bearing or sealing element.

The relationship between the linear longitudinal change of the formed body in comparison with the green state in dependence upon the percentage composition of the green body and the isostatic pressing force used in the after-heating phase is shown by the Figure of the accompanying drawing. There were used various compositions of $Al_2O_3$ in powder form and Al powder. The sintering took place by 15 min. sintering at 1150° C. and subsequent post-heating for 30 min. at 1550° C. in the air. One can see that, with decreasing content of Al powder, the isostatic pressing force necessary for a smallest possible linear shrinkage or extension increases.

The formed body according to the invention and the nature of its production possess a series of advantages which are enumerated in the following:

1. The longitudinal change between the green body and the final product is smaller than 10%, by suitable choice of the components it can be adjusted to less than 1%, even to zero.

2. The small shrinkage or extension between green and final body has the result that non-shrinking incorporation phases, such as whiskers, fibres or platelets, do not hinder the pressureless sinter procedure as in the classically produced ceramic matrices, i.e. the formed body according to the invention can thus be consolidated together with fibres with avoidance of the hot pressing.

3. The small volume change in the case of the calcining treatment also makes it possible to produce stress-free large parts.

4. Green bodies are heated up very quickly, which can, in part, considerably shorten the sintering period.

5. The sinter temperatures are, with 900° to 1200° C., considerably lower than in the case of classically produced $Al_2O_3$-containing ceramics.

6. The reaction and thus production times are, in comparison with other reaction-bound ceramics, such as RBSN or RBSC, substantially shorter; this also applies in comparison with ceramics produced according to the melt reaction process (lanxide process).

7. All powder metallurgical forming processes can be used without problems.

8. The incorporation of $ZrO_2$ contributes, because of the great oxygen conductivity of the $ZrO_2$, to an accelerated and more complete reaction of the Al-containing binding phase to $Al_2O_3$ and additionally strengthens the finished product as a result of its stress-induced transformability.

9. The classical sintering of $Al_2O_3$-containing ceramics always involves a more or less strong grain growth, which usually impairs the strength. In the case of the ceramic according to the invention, the original $Al_2O_3$ particle size used for the green body is almost retained.

10. The advantage set out under 9 also applies essentially for other incorporated phases which, on the basis of the low calcining temperatures, react scarcely or at least considerably less with the $Al_2O_3$-containing matrix phase than would be the case in the classical sintering. Consequently, here, too, morphology and size of the incorporated particles is retained.

11. An advantage especially in comparison with the ceramic composite materials produced according to the lanxide process is the very small grain size (in part <1 $\mu$m.) which can be adjusted in the body according to the invention.

Figure 1:
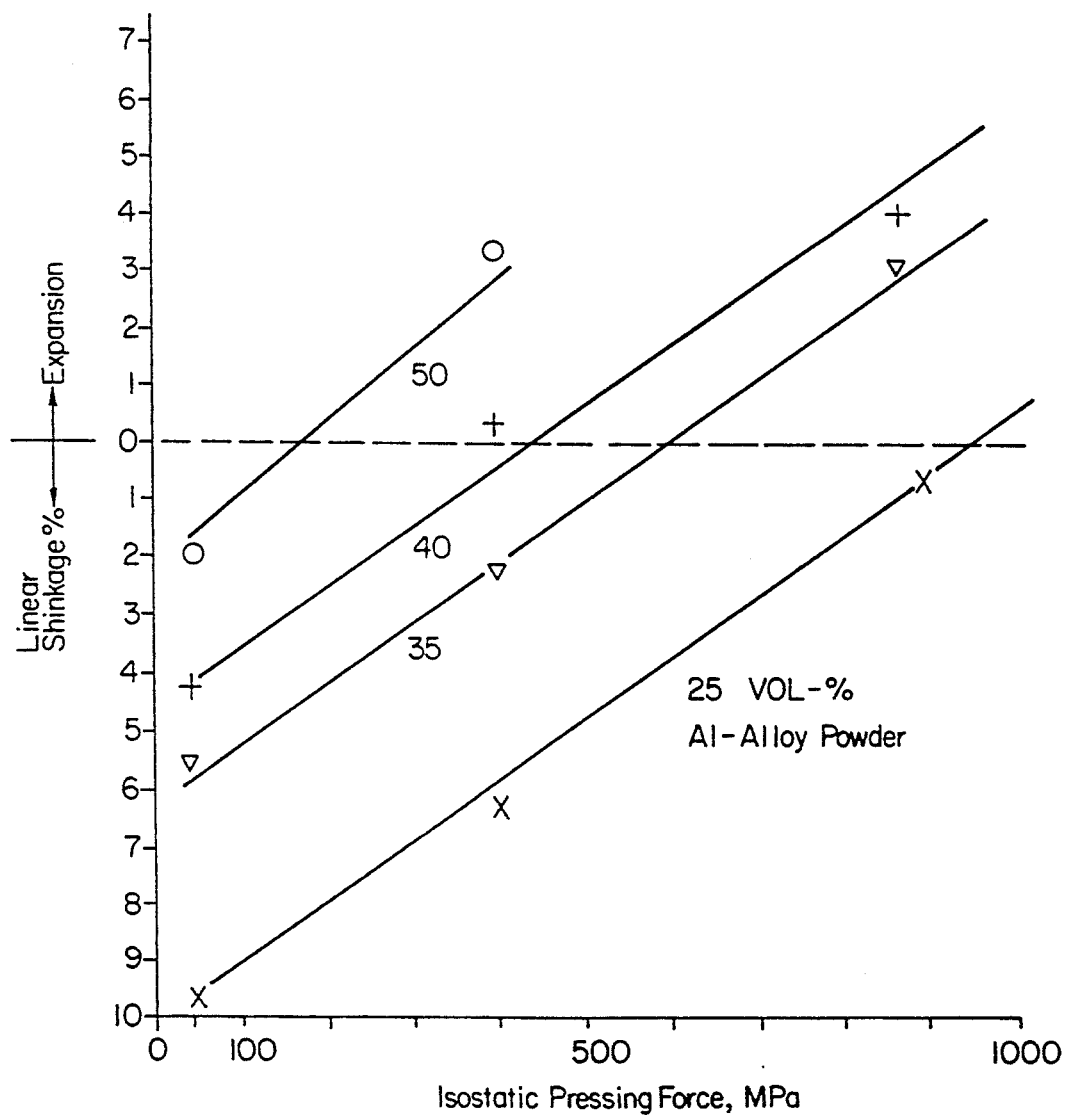
FIG. 1 shows the relationship between linear change and pressing force for $Al_2O_3$/Al composite samples which were first sintered for 15 min. at 1150° C. and subsequently for 30 min. at 1550° C. in air. Linear shrinkage %/extension is plotted against isostatic pressing force, MPa.

The following Examples further explain the invention.

EXAMPLE 1

100 g. of an amount of powder, consisting of fine $Al_2O_3$ powder (ALcoa CT 1000, d=1.3 $\mu$m.), and 25 vol. % of an Al alloying powder mixture (93 wt. % Al, 5 wt. % Si, 2 wt. % Mg, 1 wt. % Zn, all firm Eckart) were ground or mechanically alloyed for 6 h. in an attritor mill with 3 mm. TZP grinding balls in isopropanol. Thereafter, the mixture was dried in a Rotovap apparatus and subsequently isostatically pressed with pressures between 45 and 900 MPa to give cylinders with the dimensions 1 cm. high, 1 cm. diameter. Thereafter, they were calcined in air for 15 min. at 1150° C. (1st calcining step) and thereafter 30 min. at 1550° C. (2nd calcining step). After the first calcining step, the $Al_2O_3$ powder particles were bound with a newly-formed $Al_2O_3$ phase which, however, also contained pearl-shaped portions of the Al metal. After the second calcining step, the samples were bright white and the Al phase had changed completely into $Al_2O_3$. TEM investigations show that the porosity amounted to less than 10% and that some grain boundaries contained no amorphous phases.

The same experiments were also carried out with volume portions of 35, 40, 50 vol. % of Al alloying powder. The linear change in the case of the calcining (difference of the dimensions in the green state and in the final state) is illustrated in FIG. 1 of the drawing. It is clear therefrom that, in the case of certain volume proportions (or relationships of metal to ceramic powder) with, in each case, other pressing forces, a "zero" shrinkage (thus a dimension stability) could be achieved. For example, in the case of 25 vol. % of Al alloying powder, an isostatic pressure of 950 MPa would give a "zero" shrinkage.

EXAMPLE 2

Green body samples according to Example 1 were introduced into a 1200° C. hot furnace without preheating phase. The final samples did not differ from those according to Example 1, i.e. they showed no crack formation due to the thermoshock undergone.

EXAMPLE 3

100 g. of a powder mixture of 20 wt. % $ZrO_2$ doped with 2 $Y_2O_3$ and 80 wt. % $Al_2O_3$ (pre-alloyed from Toso, Japan, Type Super Z), as well as 30 vol. % of Al alloying powder (as Example 1) were treated as described in Example 1, whereby the pressing force amounted to 800 MPa, and then sintered for 1 h. at 1550° C. The linear shrinkage amounted to <3% and the strength to 300 MPa.

EXAMPLE 4

In an experimental series, two different aluminium powders were used. On the one hand, spheroidal particles with diameters between 20 and 200 $\mu$m. and more than 99% Al content (firm Aldrich-Chemie GmbH, FRG), as well as Al flocks with a size of 30 to 300 $\mu$m. and a thickness of 3 to 5 $\mu$m. (Al, "fine powdered", E. Merck AG, Darmstadt, FRG) were used. 5 wt. % Si, 2.5 wt. % Mg and 1 wt. % Zn powder were added to this powder. The metal powder was mixed with a coarse $Al_2O_3$ grinding powder of 13 $\mu$m. (F 500/13 H. C. Starck, Berlin, FRG) in amounts between 25 and 40 vol. %. The greater part of the experiments was thereby carried out with the use of a composition with 35 vol. % Al flocks. In the case of two experiments, 10 vol. % $ZrO_2$ powder, which was alloyed with 3 mole % $Y_2O_3$ (TZ-3Y, Toso, Tokyo, Japan) and 15 vol. % $Al_2O_3$ platelets (Al-13pl, Showa Aluminium Industries KK. Tokyo, Japan) of the composition containing 35 vol. % Al flocks, which in the following is called 35 C, was added thereto. The various powder mixtures were ground in an attritor with acetone or isopropanol in UHMW polyethylene containers with the use of TZP grinding balls of 3 mm. diameter. After a one to twelve hour attrition, the powder mixtures obtained were dried in a rotary evaporator. The mixtures were then isostatically pressed at 200 to 900 MPa to give quadratic rods of 24×4×4 mm. Before the heat treatment, the sample rods obtained were worked up to exact dimensions which were monitored with micrometer measurement.

The heat treatment was carried out in a vertical dilatometer (firm Bähr Gerätebau GmbH, Hüllhorst, FRG) in air at temperatures between 1000° and 1500° C. and different heating rates. The development of the microstructure was investigated by optical microscopy on partly or completely reacted-through samples infiltrated with resin. The sample bodies for the measurements of the physical properties were subjected in a box kiln to the following heat treatment:

heating rate: 5° C./minute
maintain for 8 hours at 1200° C., maintain for 2 hours at 1550° C., cooling with 15° C./minute.

The samples obtained were ground to the dimensions 22×3.5×3.5 mm. and polished and then the break strength and the chevron notch toughness $K_{IC}$ determined by 4-point bending with use of an inner and outer span width of 18 and 6 mm., respectively. The heat shock behavior was investigated by chilling from various temperatures to room temperature, water and subsequent determination of the strength maintained.

In the case of the grinding, the 13 μm. $Al_2O_3$ grains acted as support for the grinding procedure so that the Al particles were divided up into very small pieces without a welding thereof taking place. The dimensions of the Al flocks were thereby reduced after two hours to less than 10 μm. After 8 hours attrition, all the Al particles lay below about 5 μm. and were present homogeneously dispersed without development of a floccular microstructure. The size of the $Al_2O_3$ particles was reduced to about 1 μm. In the case of a grinding period of more than 8 hours, no noticeable changes of the structure were ascertained. After 8 hours grinding in acetone, only a part of the metallic aluminum lying below 1% was oxidised.

The shrinkage of the ceramic formed bodies obtained, which were obtained from the material ground for 8 hours and heat-treated as described above, amounted in the case of 400 MPa isostatic pressure to 4%, in the case of 700 MPa to less than 1%.

The bending strength of the 35 C samples iso-pressed at 400 MPa at room temperature was with 281±15 MPa, the corresponding $K_{IC}$ value 2.35±0.2 MPa $\sqrt{m}$. In the case of the samples which had been obtained with the addition of either 10 vol. % $3Y-ZrO_2$ powder of 15 vol. % $Al_2O_3$ platelets to the 35 C composition, the $K_{IC}$ value amounted to 2.6 and 2.75 MPa $\sqrt{m}$, respectively.

EXAMPLE 5

To the attrited mixture containing 40 vol. % Al alloy powder according to Example 4 were added 20 vol. % of about 1 mm. long $ZrO_2$-reinforced $Al_2O_3$ fibres (Du Pont, type PRD 166) and mixed dry in a tumbler mixer. Thereafter, green bodies were pressed with a pressure of 400 MPa and sintered at 1500° C. for 2 h. in the air. Thereafter, without having produced matrix cracks, the fibres were embedded into the $Al_2O_3$ matrix.

EXAMPLE 6

100 g. of a powder mixture of 65 vol. % AlN (H. C. Starck, grade C, about 1 μm.) and 35 vol. % of the Al alloy Powder according to Example 1 were attrited as described in Example 1, isostatically pressed at 600 MPa and subsequently sintered for 2 h. at 1550° C. under $N_2$. Thereafter, the resulting sinter body showed a shrinkage of <10%.

EXAMPLE 7

40 vol. % $Al_2O_3$ platelets (13 μm. diameter, Showa Aluminium, Tokyo, Japan) were admixed with the composition of Example 1, which had been ground in an attritor for 8 hours, in the case of further grinding in the attritor for 20 minutes. The dried mixture was iso-pressed at 400 MPa and heat treated for 8 hours at 1200° C. The linear shrinkage amounted to +2.1% (actually an expansion) and the end density amounted to 88% of the theoretical density of $Al_2O_3$ (3.96 g./cm³). The open pores were then filled with Al by pressure infiltration at 20 bar in a gas pressure furnace. The break strength of the so obtained formed bodies amounted to 420 MPa, the $K_{IC}$ value to 7.5 MPa/m., measured with the chevron notch technique with 4-point loading with the use of sample bodies of 24×4×4 mm.

EXAMPLE 8

37 g. of pure Al powder (spheroidal shape; firm Aldrich) are attrited with 63 g. $Al_2O_6$ (13 μm.) for 8 hours in acetone. With the attrited mixture are then admixed 100 g. SiC in the form of a powder which contains 30% of particles with about 5 μm. and 20% of particles with about 20 μm., for 2 hours in a drum mixer. The mixture obtained is dried and statically pressed at 300 MPa to a green body. This is subjected to a heat treatment at 1200° C. for ½ hour and at 1400° C. for 2 hours. The thereby obtained linear shrinkage with regard to the green body amounts to 0%. The open pores of the green body obtained are then filled with Al as described in Example 7.

I claim:

1. Process for the production of a powder-metallurgically produced ceramic formed body, which consists of at least one disperse inorganic component which is embedded in a phase of aluminum oxide, which displays a longitudinal change of less than ±10% in comparison with the green state, possesses a porosity of less than 15% and glass phase-free grain boundaries, said process characterized by the steps of: producing a mixture of 25 to 50 vol. % aluminum powder and optionally one or more alloying elements selected from the group consisting of Mn, Mg, Si, Zn, Pb, Na, Li and Se and a disperse inorganic component which contains at least 40 vol. % of aluminum oxide, based on the mixture, attriting the mixture for at least 1 hour and then forming a green body therefrom and sintering the green body in an oxygen-containing atmosphere at temperatures between 900° and 1700° C.

2. Process according to claim 1, characterized in that the Al is used with the alloying elements in the form of a pre-alloy or of a powder mixture.

3. Process according to claim 2, characterized in that the content of metallic alloying elements, based on the amount of aluminum, amounts to 0.1 to 10 wt. % of one or more of the alloying elements selected from the group consisting of Mg, Si, Mn, Zn, Pb, Se, Na and Li.

4. Process according to claim 3, characterized in that the aluminum powder is used as mixture of non-alloyed Al powder with oxides of the alloying elements and Mg is used in the form of MgO or $MgAl_2O_4$, Si in the form of $SiO_2$ and Zn in the form of ZnO.

5. Process according to claim 1, characterized in that an aluminum oxide powder is used with a particle size in the range of 1 to 100 μm, as disperse inorganic starting component.

6. Process according to claim 5, characterized in that an aluminum oxide particle size of 10 to 30 μm is used.

7. Process according to claim 1, characterized in that the disperse inorganic component additionally contains one or more phases selected from the group consisting of $ZrO_2$, SiC, $B_4C$, TiC, WC, TaC, $Si_3N_4$, $ZrB_2$ and $TiB_2$.

8. Process according to claim 1, characterized in that, to the attrited mixture, there are added fibres, whiskers or platelets of compounds selected from the group consisting of mullite, SiC, $B_4C$, TiC, $Si_3N_4$, $Al_2O_3$ and alloys thereof in an amount of 5 to 50 vol. %, based on the attrited mixture.

9. Process according to claim 1, characterized in that the green body is dry pressed, slip cast, injection moulded or extruded from the mixture.

10. Process according to claim 1, characterized in that the sintering is carried out in air at temperatures between 900° and 1550° C. and 0.05 to 10 MPa total pressure.

11. Process according to claim 10, characterized in that the green body, is introduced into the hot furnace at temperatures between 900° and 1200° C., kept at this temperature up to partial or complete reaction of the Al powder and subsequently cooled.

12. Process according to claim 11, characterized in that the green body is subjected to a calcining treatment at 900° to 1200° C., and after the calcining treatment the green body is heated to 1300° to 1600° C. in order to guarantee a complete reaction.

13. Process according to claim 1, characterized in that, after sintering of the green body, it is hot isostatically post-consolidated in a pressure transfer medium of Ar, $N_2$ or a mixture of Ar and $O_2$.

14. Process according to claim 11, characterized in that, after the partial or complete reaction of the Al powder, the formed body is infiltrated at 900° to 1700° C. with liquid Al.

15. Process according to claim 1, characterized in that the disperse inorganic component additionally contains $ZrO_2$ undoped or doped with a compound selected from the group consisting of $Y_2O_3$, $CeO_2$, MgO and CaO.

* * * * *